United States Patent
Tam et al.

(10) Patent No.: US 8,245,934 B1
(45) Date of Patent: Aug. 21, 2012

(54) APPARATUS AND METHOD FOR AUTOMATICALLY PROVIDING INFORMATION TO A NEW COMPUTER

(75) Inventors: Wai Hong Tam, Taipei (TW); Tammo Spalink, Taipei (TW)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/273,181

(22) Filed: Oct. 13, 2011

Related U.S. Application Data

(60) Provisional application No. 61/542,122, filed on Sep. 30, 2011.

(51) Int. Cl.
| | |
|---|---|
| G06K 7/10 | (2006.01) |
| G06K 19/06 | (2006.01) |
| G06K 7/00 | (2006.01) |
| G06F 19/00 | (2011.01) |
| G06F 7/10 | (2006.01) |

(52) U.S. Cl. ......... 235/462.11; 235/462.01; 235/462.15; 235/435; 235/454

(58) Field of Classification Search ............. 235/462.11, 235/435, 454, 462.01, 462.15
See application file for complete search history.

(56) References Cited

U.S. PATENT DOCUMENTS

| | | | | |
|---|---|---|---|---|
| 4,825,058 A | * | 4/1989 | Poland | 235/462.01 |
| 4,861,972 A | * | 8/1989 | Elliott et al. | 235/462.15 |
| 5,189,291 A | * | 2/1993 | Siemiatkowski | 235/462.45 |
| 5,923,022 A | * | 7/1999 | Penn et al. | 235/462.08 |
| 6,330,973 B1 | * | 12/2001 | Bridgelall et al. | 235/462.45 |
| 7,353,995 B2 | * | 4/2008 | Strickland | 235/462.01 |
| 7,546,953 B1 | * | 6/2009 | Collins, Jr. | 235/462.43 |
| 2002/0130181 A1 | * | 9/2002 | Reddersen et al. | 235/462.15 |
| 2003/0057281 A1 | * | 3/2003 | Kresina et al. | 235/462.01 |
| 2003/0155422 A1 | * | 8/2003 | Kawakami et al. | 235/462.46 |
| 2004/0206821 A1 | * | 10/2004 | Longacre et al. | 235/462.07 |
| 2005/0086328 A1 | * | 4/2005 | Landram et al. | 709/220 |
| 2006/0032914 A1 | * | 2/2006 | Brewster et al. | 235/383 |
| 2006/0261161 A1 | * | 11/2006 | Murofushi et al. | 235/383 |
| 2007/0205277 A1 | * | 9/2007 | Tashiro | 235/383 |
| 2007/0228137 A1 | * | 10/2007 | Bhella et al. | 235/375 |
| 2008/0250122 A1 | * | 10/2008 | Zsigmond et al. | 709/220 |
| 2010/0065631 A1 | * | 3/2010 | Orlewski | 235/383 |
| 2010/0315200 A1 | * | 12/2010 | Warrier | 340/5.51 |
| 2012/0007738 A1 | * | 1/2012 | Barkan et al. | 340/540 |

* cited by examiner

*Primary Examiner* — Daniel Walsh

(74) *Attorney, Agent, or Firm* — McDermott Will & Emery LLP

(57) ABSTRACT

A system and method is disclosed for automatically providing information to a newly-manufactured computing device. During the manufacture of a new computing device at an assembly line, a camera integrated with the computing device is automatically activated as a barcode scanner. On the camera viewing a barcode that includes device-specific configuration information, the barcode is read by the computing device to read the device-specific configuration information for storage in a non-volatile memory of the device.

18 Claims, 5 Drawing Sheets

APPARATUS AND METHOD FOR AUTOMATICALLY PROVIDING INFORMATION TO A NEW COMPUTER

REFERENCE TO RELATED APPLICATIONS

The present application claims priority benefit under 35 U.S.C. §119(e) from U.S. Provisional Application No. 61/542,122, filed Sep. 30, 2011, which is incorporated herein by reference in its entirety.

TECHNICAL FIELD

The subject technology relates generally to the manufacturing and testing of computing devices.

BACKGROUND

During the manufacturing process, a new computer must be taught certain information about itself for example, its serial number, memory, speed, operating system, hardware capabilities, and the like). Currently, providing the computer with this information includes manually scanning with a barcode reader a barcode attached to the computer to retrieve a serial number, using that serial number to retrieve information specific to the computer, and then manually loading that information into the computer.

SUMMARY

The subject technology provides a system and computer-implemented method for automatically providing information to a newly-manufactured computing device. According to one aspect, the system includes activating an integrated camera associated with the computing device as a barcode scanner, waiting for a barcode to be viewed by the integrated camera, and, on the integrated camera viewing a barcode that includes device-specific configuration information, reading the barcode to read the device-specific configuration information, and storing the device-specific configuration information on a system memory of the computing device. In another aspect, the method may include connecting to a configuration system via a network connection, transmitting to the configuration system the serial number, receiving from the configuration system, secondary configuration information about the computing device, and, on receiving the secondary configuration information, automatically storing the secondary configuration information to the system memory.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

Figure 1:
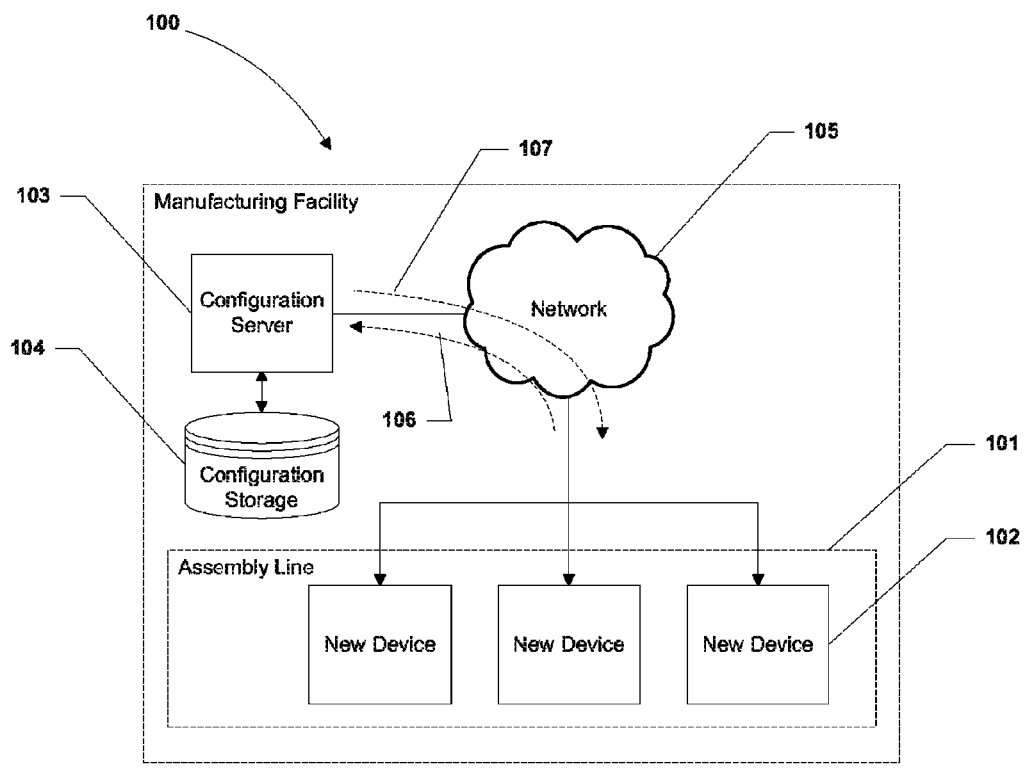
FIG. 1 is a diagram of a system, including an assembly line, for automatically providing information to newly-manufactured computing devices according to one aspect of the subject technology.

FIG. 1 is a diagram of a system, including an assembly line, for automatically providing information to newly-manufactured computing devices according to one aspect of the subject technology. A system 100 may include an assembly line 101 configured to receive for configuration one or more computing devices 102, a configuration server 103, and a configuration storage 104 (for example, a database or file system). Assembly line 101 may include a sequential organization of technicians, tools or machines, and/or parts to facilitate the configuration of a one or more devices 102. Configuration server 103 may be operably connected to the one or more devices 102 at assembly line 101 using a wired or wireless network 105 (for example, a secure WAN, LAN, or the Internet). Each device 102 may be connected using an Ethernet cable to a local area network (LAN) using a local router, or each device 102 may be configured to include a wireless connection to a wireless router.

A computing device 102 compatible with assembly line 101 may include, for example, a notebook computer, tablet computer, personal digital assistant (PDA), smart phone, or the like. Each computing device 102 may include an integrated camera (for example, a camera built into a display of the device). During the configuration of a device 102 at assembly line 101, the camera of device 102 may be activated and presented with a barcode that includes a serial number associated with the device. The camera may be configured to automatically read the barcode to read and/or store the serial number, and then automatically transmit 106 the serial number to configuration server 103 using network 105. A configuration server 103 may be configured to receive the serial number scanned at assembly line 101 by the camera, and facilitate the download to the device of further device-specific configuration information associated with the serial number.

Figure 2:
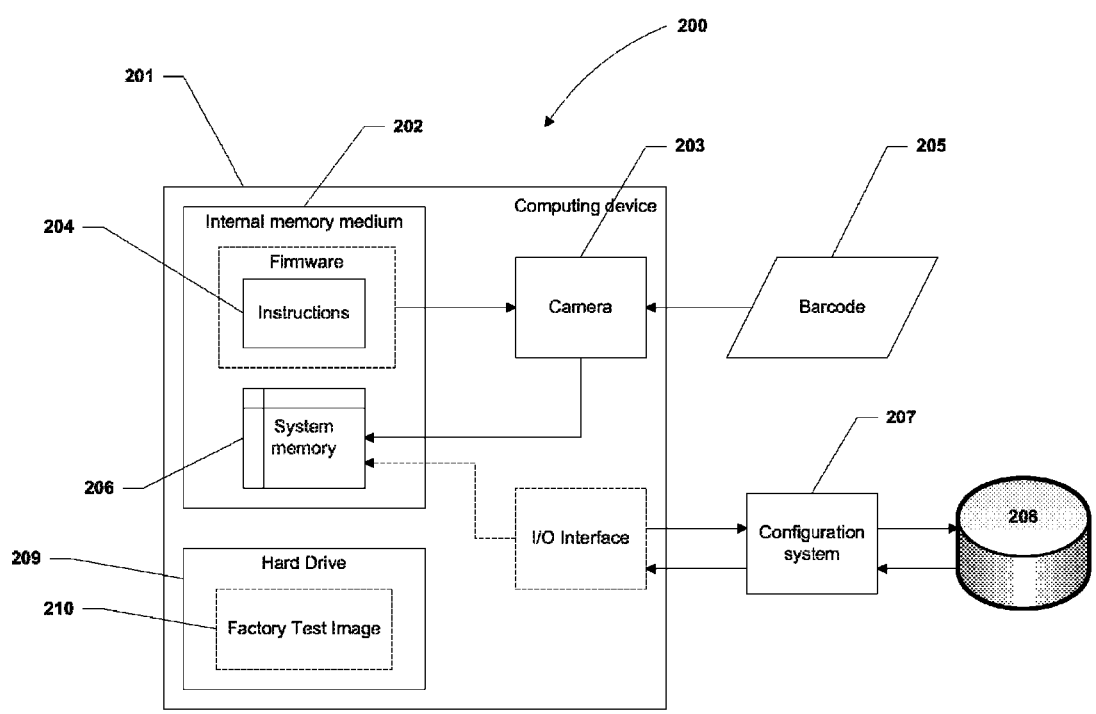
FIG. 2 is a diagram of a computing device, including an integrated camera, and a barcode for automatically providing information to a newly-manufactured computing device according to one aspect of the subject technology.

FIG. 2 is a diagram of a computing device, including an integrated camera, and a barcode for automatically providing information to a newly-manufactured computing device according to one aspect of the subject technology. A computing device 201 may include one or more internal memory mediums 202 and an associated camera 203. Camera 203 may include an integrated camera (for example, built into a display) or may be a component separate from, or configurably mountable to, computing device 201. An internal memory medium 202 may include firmware instructions 204 that, when executed by a processor associated with computing device 201 (see, for example, FIG. 4), configure computing device 201 to initiate a boot up and to activate camera 203 as a barcode scanner. In one aspect, device 201 is configured to execute firmware instructions 204 when powered on for the first time.

When camera 203 is activated as a barcode scanner, a barcode 205 may be positioned to be viewable by camera 203. For example, barcode 205 may be placed in front of the camera by an assembly line technician, or automatically by machinery at assembly line 101. Camera 203 may automatically read encoded information from barcode 205 and store the encoded information onto an internal system memory 206. System memory 206 may be implemented as a secure area or partition on the same internal memory medium 202 that stores firmware instructions 204, or, in other aspects, implemented as a separate internal memory medium 202.

System memory 206 may be a write-once memory (for example, an EPROM, EEPROM, or other non-volatile memory), wherein, once the information is stored thereon, the information becomes read-only. For example, after storing the device-specific configuration information on system memory 206, computing device 201 may be configured to set system memory 206 to a read-only state (for example, by applying a voltage to one or more specific pins of an EPROM or EEPROM).

Barcode 205 may be encoded with information related to the computing device 201. For example, barcode 205 may include a serial number of device 201, along with secondary configuration information related to, for example, memory, speed, operating system, hardware capabilities, and the like. In this regard, barcode 205 may be a matrix 2D barcode having the serial number and secondary configuration information encoded thereon. On reading barcode 205, computing device 201 may receive configuration information about itself.

In one aspect, barcode 204 may be encoded with limited information, such as a serial number. On reading a serial number from barcode 205, computing device 201 may be configured to connect to configuration system 207 (for example, including configuration computer 103) to retrieve the previously described information. Firmware instructions 204, when executed, may cause the processor to connect to configuration system 207, including storage 208 for storing configuration information (for example, configuration storage 104), by means of a connection through a network (for example, network 105). Computing device 201 may transmit to configuration system 207 the serial number read from barcode 205 to receive the previously described secondary configuration information about the computing device. To this end, configuration system 207 and/or storage 208 may be configured to store the previously described secondary configuration information for one or more computing devices 201, indexed by serial numbers. On configuration system 207 receiving a serial number, configuration system 207 may perform a lookup of the secondary configuration information and then transmit the secondary configuration information to computing device 201 for storage at system memory 206.

In another aspect, activating camera 203, reading barcode 205, storing the serial number and/or secondary configuration information to system memory 206, and the like, may be the result of executing instructions from a location different than internal memory medium 202. In one example, computing device 201 may include a memory medium 209 (for example, a hard drive, removable flash drive, USB drive, or the like) for storing a factory boot image 210. Boot image 210 may not include standard operating system features (for example, a browser), but, rather, may include a limited feature set for configuring and/or testing the hardware systems of a computing device (for example, physical memory addresses and hardware functions, network capability, and the like). Boot image 210 may be responsible for, among other things, configuring device 201. Computing device 201 may be configured, on a power up, to access and load the previously described firmware instructions 204 from internal memory medium 202 and to initiate a further boot up of the device by loading and executing a boot image 210. Boot image 210, when executed, may then activate camera 203 and wait to read configuration information from a barcode 205.

Figure 3:
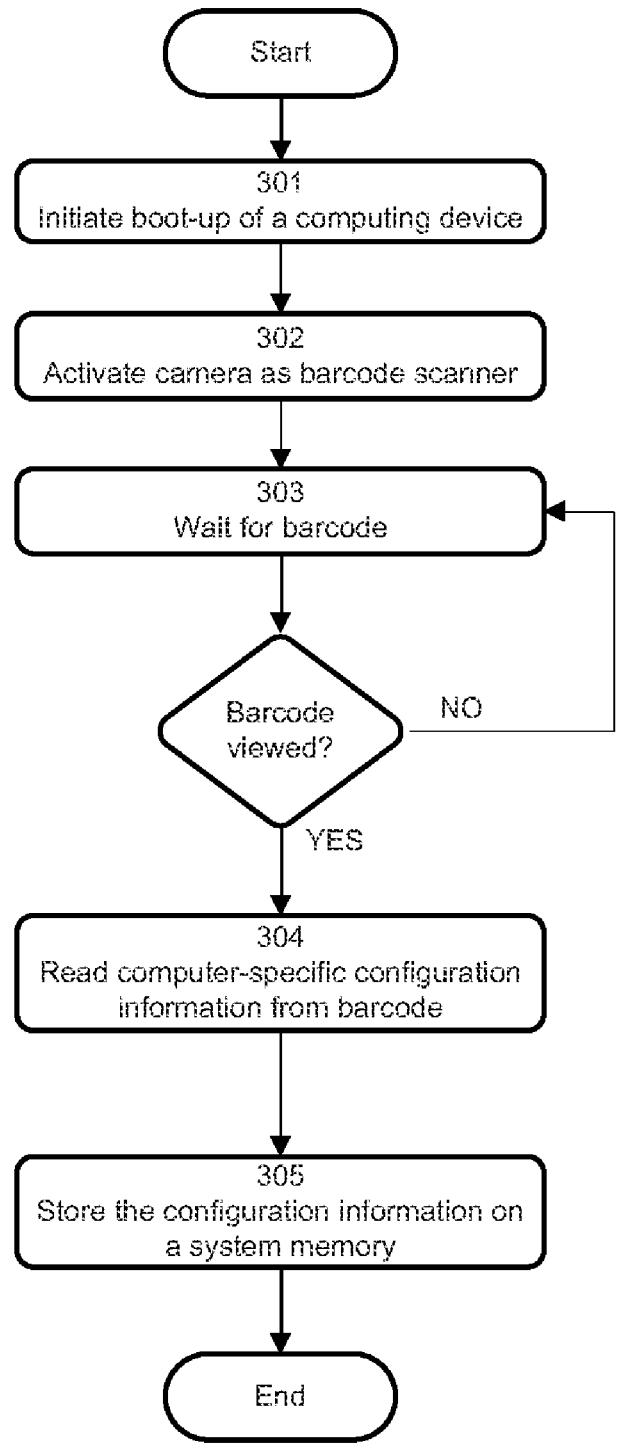
FIG. 3 is a flowchart illustrating a process for automatically providing configuration information to a newly-manufactured computing device according to one aspect of the subject technology.

FIG. 3 is a flowchart illustrating a process for automatically providing configuration information to a newly-manufactured computing device according to one aspect of the subject technology. According to one aspect, computing device (for example, computing device 101) may be configured with configuration instructions that, when executed on a start up of the computing device, automatically configure the device to load configuration information. In a first process 301, a boot-up of the computing device is initiated (for example, for the first time). In a second process 302, a camera associated with the computing device is activated as a barcode scanner. In some aspects, the camera may be integrated into the display of the computing device. In a third process 303, the camera remains idle and waits for a barcode to be positioned to be viewable by the camera. On the camera viewing a barcode that includes device-specific configuration information, in a fourth process 304, the camera reads the barcode to read the device-specific configuration information, and then, in a fifth process 305, the computing device stores the device-specific configuration information in a system memory.

Figure 4:
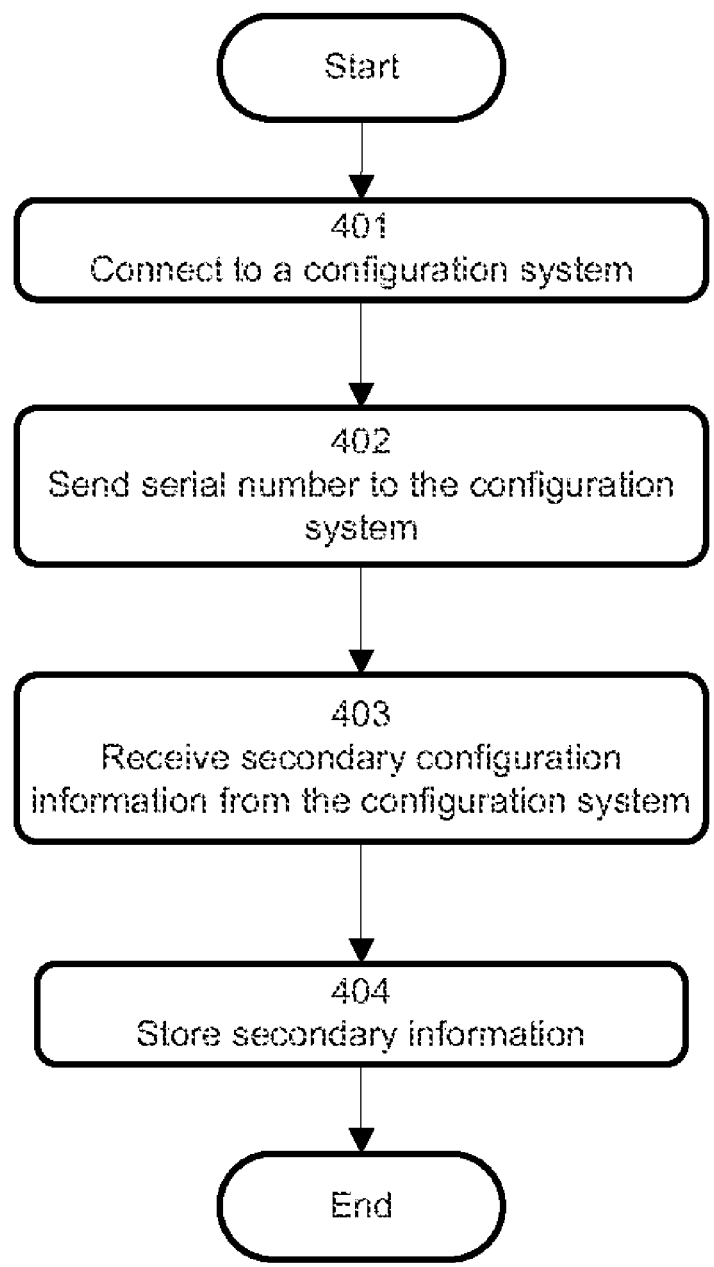
FIG. 4 is a flowchart illustrating a process for automatically downloading configuration information to a newly-manufactured computing device according to one aspect of the subject technology.

FIG. 4 is a flowchart illustrating a process for automatically downloading configuration information to a newly-manufactured computing device according to one aspect of the subject technology. In some aspects, the device-specific configuration information includes a serial number. The instructions, when executed, may cause the computing device to, in a sixth process 401, connect to an configuration system through a network connection. In a seventh process 402, the computing device sends the serial number to the configuration system. In an eighth process 403, in response to receiving the serial number at the configuration system, secondary configuration information about the computing device is sent from the configuration system to the computing device. In a ninth process 404, the secondary configuration information is stored to the computing device.

Therefore, using the subject technology, a new computing device, in an assembly line, may be activated to load and execute initiation instructions stored thereon to activate a camera associated with the new device as a barcode scanner. A barcode, including information related to the new device, may be positioned to be viewable by the camera. On the camera viewing the barcode, the information is read by the camera and stored on a system memory of the computing device. In some aspects, the device may connect to an configuration system to download secondary configuration information based on the information related to the computing device, and then store the secondary configuration information on a system memory of the computing device. In a further aspect, a technician working in the assembly line may verify that the information was stored to the system memory.

Figure 5:
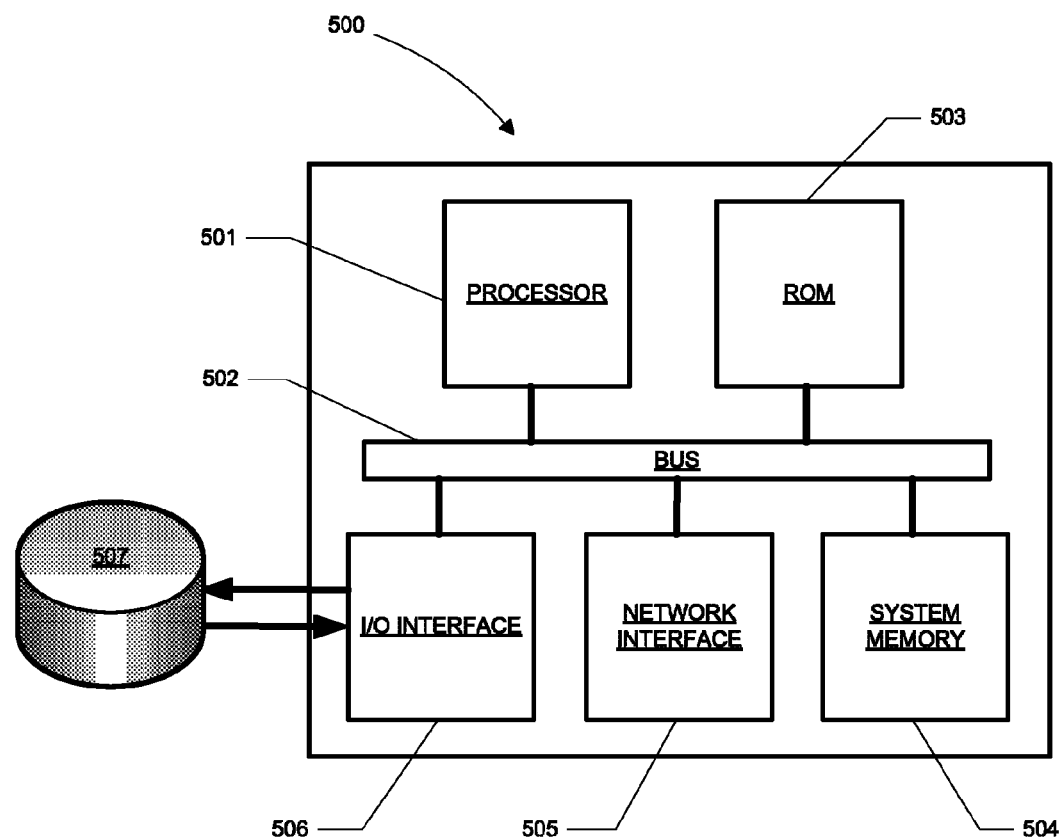
FIG. 5 is a diagram illustrating a machine or computer for automatically providing information to a newly-manufactured computing device, including a processor and other internal components, according to one aspect of the subject technology.

FIG. 5 is a diagram illustrating a machine or computer for automatically providing information to a newly-manufactured computing device, including a processor and other internal components, according to one aspect of the subject technology. In some aspects, a computerized device 500 (for example, computing device 102, configuration server 103, or the like) includes several internal components such as a processor 501, a system bus 502, read-only memory 503, system memory 504, network interface 505, I/O interface 506, and the like. In one aspect, processor 501 may also be communication with a storage medium 507 (for example, a hard drive, database, or data cloud) via I/O interface 506. In some aspects, all of these elements of device 500 may be integrated into a single device. In other aspects, these elements may be configured as separate components.

Processor 501 may be configured to execute code or instructions to perform the operations and functionality described herein, manage request flow and address mappings, and to perform calculations and generate commands. Processor 501 is configured to monitor and control the operation of the components in server 500. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on a ROM within processor 501. Likewise, one or more sequences of instructions may be software stored and read from system memory 505, ROM 503, or received from a storage medium 507 (for example, via I/O interface 506). ROM 503, system memory 505, and storage medium 507 represent examples of machine or computer readable media on which instructions/code may be executable by processor 501. Machine or computer readable media may generally refer to any medium or media used to provide instructions to processor 501, including both volatile media, such as dynamic memory used for system memory 504 or for buffers within processor 501, and non-volatile media, such as electronic media, optical media, and magnetic media.

In some aspects, processor 501 is configured to communicate with one or more external devices (for example, via I/O interface 506). Processor 501 is further configured to read data stored in system memory 504 and/or storage medium 507 and to transfer the read data to the one or more external devices in response to a request from the one or more external devices. The read data may include one or more web pages and/or other software presentation to be rendered on the one or more external devices. The one or more external devices may include a computing system such as a personal computer, a server, a workstation, a laptop computer, PDA, smart phone, and the like.

In some aspects, system memory 504 represents volatile memory used to temporarily store data and information used to manage device 500. According to one aspect of the subject technology, system memory 504 is random access memory (RAM) such as double data rate (DDR) RAM. Other types of RAM also may be used to implement system memory 504. Memory 504 may be implemented using a single RAM module or multiple RAM modules. While system memory 504 is depicted as being part of device 500, those skilled in the art will recognize that system memory 504 may be separate from device 500 without departing from the scope of the subject technology. Alternatively, system memory 504 may be a non-volatile memory such as a magnetic disk, flash memory, peripheral SSD, and the like.

I/O interface 506 may be configured to be coupled to one or more external devices, to receive data from the one or more external devices and to send data to the one or more external devices, I/O interface 506 may include both electrical and physical connections for operably coupling I/O interface 506 to processor 501, for example, via the bus 502. I/O interface 506 is configured to communicate data, addresses, and control signals between the internal components attached to bus 502 (for example, processor 501) and one or more external devices (for example, a hard drive). I/O interface 506 may be configured to implement a standard interface, such as Serial-Attached SCSI (SAS), Fiber Channel interface, PCI Express (PCIe), SATA, USB, and the like. I/O interface 506 may be configured to implement only one interface. Alternatively, I/O interface 506 may be configured to implement multiple interfaces, which are individually selectable using a configuration parameter selected by a user or programmed at the time of assembly. I/O interface 506 may include one or more buffers for buffering transmissions between one or more external devices and bus 502 and/or the internal devices operably attached thereto.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The term website, as used herein, may include any aspect of a website, including one or more web pages, one or more servers used to host or store web related content, and the like. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A computing device, comprising:
a processor;
an integrated camera; and
a memory medium; and
a system memory separate from the memory medium,
wherein the memory medium includes configuration instructions that, when executed by the processor, cause the processor to:
activate the integrated camera as a barcode scanner;
read a barcode that corresponds to device-specific configuration information;
store the device-specific configuration information to the system memory; and
set the system memory to a read-only state.

2. The computing device of claim 1, wherein the device-specific configuration information includes a serial number, and
wherein the configuration instructions, when executed by the processor, further cause the processor to:
connect to a configuration system via a network connection;
transmit to the configuration system the serial number;
receive, from the configuration system, secondary configuration information about the computing device; and
store the secondary configuration information to the computing device.

3. The computing device of claim 1, wherein the configuration instructions are implemented as firmware stored on the memory medium.

4. The computing device of claim 1, wherein the barcode is a matrix 2D barcode, and wherein the device-specific configuration information includes a serial number and secondary configuration information about the computing device.

5. The computing device of claim 1, wherein the system memory is implemented as an EPROM.

6. The computing device of claim 1, further comprising:
a firmware memory containing firmware instructions configured to be accessed on a power-on of the computing device, wherein the firmware instructions, when executed by the processor, cause the processor to:
load for execution by the processor, the configuration instructions from the memory medium, wherein the configuration instructions are stored on the memory medium as a factory test image.

7. A computer-implemented method for automatically providing information to a computing device, comprising:
activating an integrated camera associated with the computing device as a barcode scanner;
waiting for a barcode to be viewed by the integrated camera;
on the integrated camera viewing a barcode that includes device-specific configuration information, electronically reading the barcode to read the device-specific configuration information, and electronically storing the device-specific configuration information on a system memory of the computing device, wherein the storing electronically sets the system memory to read only; and
loading and executing initiation instructions responsible for the activating, reading, and storing steps from a memory medium,
wherein the initiation instructions are stored on the memory medium as a factory test image.

8. A computer-implemented method for automatically providing information to a new computing device, comprising:
activating an integrated camera associated with the new computing device as a barcode scanner;
waiting for a barcode to be viewed by the integrated camera;
on the integrated camera viewing a barcode that includes device-specific configuration information, electronically reading the barcode to read the device-specific configuration information, and electronically storing the device-specific configuration information on a system memory of the new computing device; and
electronically setting the system memory to a read-only state after storing the device-specific configuration information on the system memory.

9. The computer-implemented method of claim 8, wherein the device-specific configuration information includes a serial number, the method further comprising:
connecting to an configuration system via a network connection;
transmitting the serial number to the configuration system;
receiving secondary configuration information about the computing device from the configuration system; and
on receiving the secondary configuration information, automatically storing the secondary configuration information to the system memory.

10. The computer-implemented method of claim 8, wherein reading the barcode includes reading a matrix 2D barcode, and wherein the device-specific configuration information includes a serial number and secondary configuration information about the computing device.

11. The computer-implemented method of claim 8, further comprising:
   loading and executing initiation instructions responsible for the activating, reading, and storing steps from a memory medium.

12. The computing device of claim 11, wherein the initiation instructions are stored on the memory medium as a factory test image.

13. The computing device of claim 11, wherein the memory medium is a firmware device on a system board of the computing device.

14. The computing device of claim 11, wherein the memory medium is a hard drive associated with the computing device.

15. A computer-implemented method for automatically providing information to a plurality of new computing devices, comprising:
   in an assembly line comprising a plurality of new computing devices, activating a new computing device of the plurality of new computing devices on the assembly line to load and execute initiation instructions stored on the new computing device, the initiation instructions activating an integrated camera associated with the new computing device as a barcode scanner;
   positioning a barcode to be viewable by the integrated camera, the barcode including information related to the new computing device;
   wherein, on the integrated camera viewing the barcode, the information is read by the integrated camera and stored on a system memory of the new computing device, wherein the system memory is electronically set to read-only after the storing.

16. The computer-implemented method of claim 15, wherein, on the integrated camera reading the information, the computing device connects to a configuration system to download secondary configuration information based on the information related to the new computing device, and stores the secondary configuration information on the system memory of the computing device.

17. The computer-implemented method of claim 16, further comprising:
   verifying that the secondary configuration information was stored on the system memory.

18. The computing device of claim 7, wherein the memory medium is a hard drive.

\* \* \* \* \*